United States Patent
Reynolds

(10) Patent No.: US 12,455,735 B2
(45) Date of Patent: *Oct. 28, 2025

(54) SYSTEM AND METHODS FOR SOFTWARE SECURITY INTEGRITY

(71) Applicant: Wells Fargo Bank, N.A., San Francisco, CA (US)

(72) Inventor: Jerry Joseph Reynolds, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/364,781

(22) Filed: Aug. 3, 2023

(65) Prior Publication Data

US 2025/0045045 A1 Feb. 6, 2025

(51) Int. Cl.
*G06F 8/70* (2018.01)
*G06F 8/10* (2018.01)
*G06F 21/57* (2013.01)

(52) U.S. Cl.
CPC .................. *G06F 8/70* (2013.01); *G06F 8/10* (2013.01); *G06F 21/577* (2013.01); *G06F 2221/033* (2013.01)

(58) Field of Classification Search
CPC . G06F 8/70; G06F 8/10; G06F 40/284; G06F 21/577; G06F 2221/033
USPC ................................ 717/101–140; 706/25–45
See application file for complete search history.

(56) References Cited

U.S. PATENT DOCUMENTS

| 6,728,695 | B1 * | 4/2004 | Pathria .................. G06F 40/216 |
| | | | 707/E17.084 |
| 8,347,267 | B2 * | 1/2013 | Givoni ................ G06F 11/3688 |
| | | | 717/124 |
| 9,544,327 | B1 | 1/2017 | Sharma et al. |
| 9,754,117 | B2 | 9/2017 | Bender et al. |
| 9,769,208 | B2 | 9/2017 | Chari et al. |
| 10,062,039 | B1 * | 8/2018 | Lockett .................. G06N 3/044 |
| 10,768,893 | B2 * | 9/2020 | Misra .................. G06F 11/3676 |
| 10,769,721 | B2 | 9/2020 | Prabhu et al. |
| 10,880,332 | B2 | 12/2020 | Johnson et al. |
| 10,990,898 | B2 | 4/2021 | Motahari Nezhad et al. |
| 11,055,420 | B2 | 7/2021 | De Gaetano et al. |
| 11,115,421 | B2 | 9/2021 | Nevatia et al. |

(Continued)

FOREIGN PATENT DOCUMENTS

EP 3355248 10/2018

OTHER PUBLICATIONS

Xue et al., "Machine Learning Security: Threats, Countermeasures, and Evaluations", IEEE, pp. 1-23 (Year: 2020).*

(Continued)

*Primary Examiner* — Anil Khatri
(74) *Attorney, Agent, or Firm* — SCHWEGMAN LUNDBERG & WOESSNER, P.A.

(57) ABSTRACT

A method may include querying a project data store with a project identifier using a processing unit. The query retrieves the functional requirement of a stored project data structure associated with the identifier. This requirement is then input into a trained machine learning model, which has output nodes corresponding to a set of requirement classifications. The output values from the model are accessed, and a requirement classification is added to the project data structure based on these values.

20 Claims, 10 Drawing Sheets

(56) References Cited

U.S. PATENT DOCUMENTS

| | | | |
|---|---|---|---|
| 11,184,359 | B2 | 11/2021 | Kliger et al. |
| 11,195,137 | B2 | 12/2021 | Kushida et al. |
| 11,238,411 | B1* | 2/2022 | Wong .................... G06N 3/044 |
| 11,263,317 | B2 | 3/2022 | Kandel et al. |
| 11,263,327 | B2 | 3/2022 | Steele et al. |
| 11,271,962 | B2 | 3/2022 | Steele |
| 11,295,167 | B2* | 4/2022 | Rodriguez ............. G06V 20/00 |
| 11,704,569 | B2* | 7/2023 | Guo ....................... G06N 3/042 |
| | | | 706/25 |
| 11,847,424 | B1 | 12/2023 | Harkous et al. |
| 11,853,196 | B1* | 12/2023 | Pandurangarao ... G06F 11/3688 |
| 11,954,019 | B2* | 4/2024 | Sharma ................. G06N 3/088 |
| 12,183,050 | B1* | 12/2024 | Khinvasara .......... G06V 10/255 |
| 12,202,183 | B1* | 1/2025 | Usui ................... B29C 45/7693 |
| 12,307,247 | B1* | 5/2025 | Dziubinski ......... G06F 11/3616 |
| 12,314,882 | B1* | 5/2025 | Badichi ................... H04L 67/10 |
| 2020/0153855 | A1 | 5/2020 | Kirti et al. |
| 2020/0320450 | A1* | 10/2020 | Datta Ray ........... H04L 63/1408 |
| 2021/0326466 | A1 | 10/2021 | Dharanikota et al. |
| 2022/0004951 | A1 | 1/2022 | Santhar et al. |
| 2022/0036260 | A1 | 2/2022 | Krishnan et al. |

OTHER PUBLICATIONS

Hossain et al., "Application of Big Data and Machine Learning in Smart Grid, and Associated Security Concerns: A Review", IEEE, pp. 1-29 (Year: 2019).*

Khan et al., "Systematic Literature Review on Security Risks and Its Practices in Secure Software Development", IEEE, pp. 1-26 (Year: 2021).*

Petre et al., "Security Thinking in Online Freelance Software Development", IEEE, pp. 1-12 (Year: 2023).*

Singh et al., "Transfer Learning Code Vectorizer based Machine Learning Models for Software Defect Prediction", IEEE, pp. 1-6 (Year: 2020).*

Bobade et al., "Improving Software Defects Detection: An In-Depth Analysis of Machine Learning Methods and Static Analysis Tools for Greater Accuracy", IEEE, (Year: 2025).*

U.S. Appl. No. 18/364,766, filed Aug. 3, 2023, System and Methods for Software Security Integrity.

Apruzzese, G, "On the Effectiveness of Machine and Deep Learning for Cyber Security", 10th International Conference on Cyber Conflict CyCon X: Maximising Effects, (2018), 26 pgs.

Sharma, R, "Automated identification of business rules in requirements documents", 2014 IEEE International Advance Computing Conference (IACC), (2014), 6pgs.

"U.S. Appl. No. 18/364,766, Notice of Allowance mailed Jun. 18, 2025", 13 pgs.

Bobade, "Improving Software Defects Detection: An In-Depth Analysis of Machine Learning Methods and Static Analysis Tools for Greater Accuracy", IEEE, (2025), 1-6.

Khan, "Systematic Literature Review on Security Risks and its Practices in Secure Software Development", IEEE, (2021), 1-26.

Rauf, "Security Thinking in Online Freelance Software Development", IEEE, (2023), 1-12.

Singh, "Transfer Learning Code Vectorizer based Machine Learning Models for Software Defect Prediction", IEEE, (2020), 1-6.

* cited by examiner

SYSTEM AND METHODS FOR SOFTWARE SECURITY INTEGRITY

BACKGROUND

Software development includes many stages. Initially there may be a concept of what the software should accomplish. During the implementation stage, care must be taken to ensure that the software (e.g., application, microservice, functions, scripts, application programming interfaces, etc., collectively referred to as applications in the examples herein) performs in a secure manner. For example, if the application needs to use personal identifiable information (PII), a software development task may be added to implement secure storage and limit access to the PII to approved processes and subjects. Project management software may be used to help aid the tracking of tasks for the software development. In some instances, there may be completion criteria that should be met before the application is deployed to a user.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

DETAILED DESCRIPTION

Figure 1:
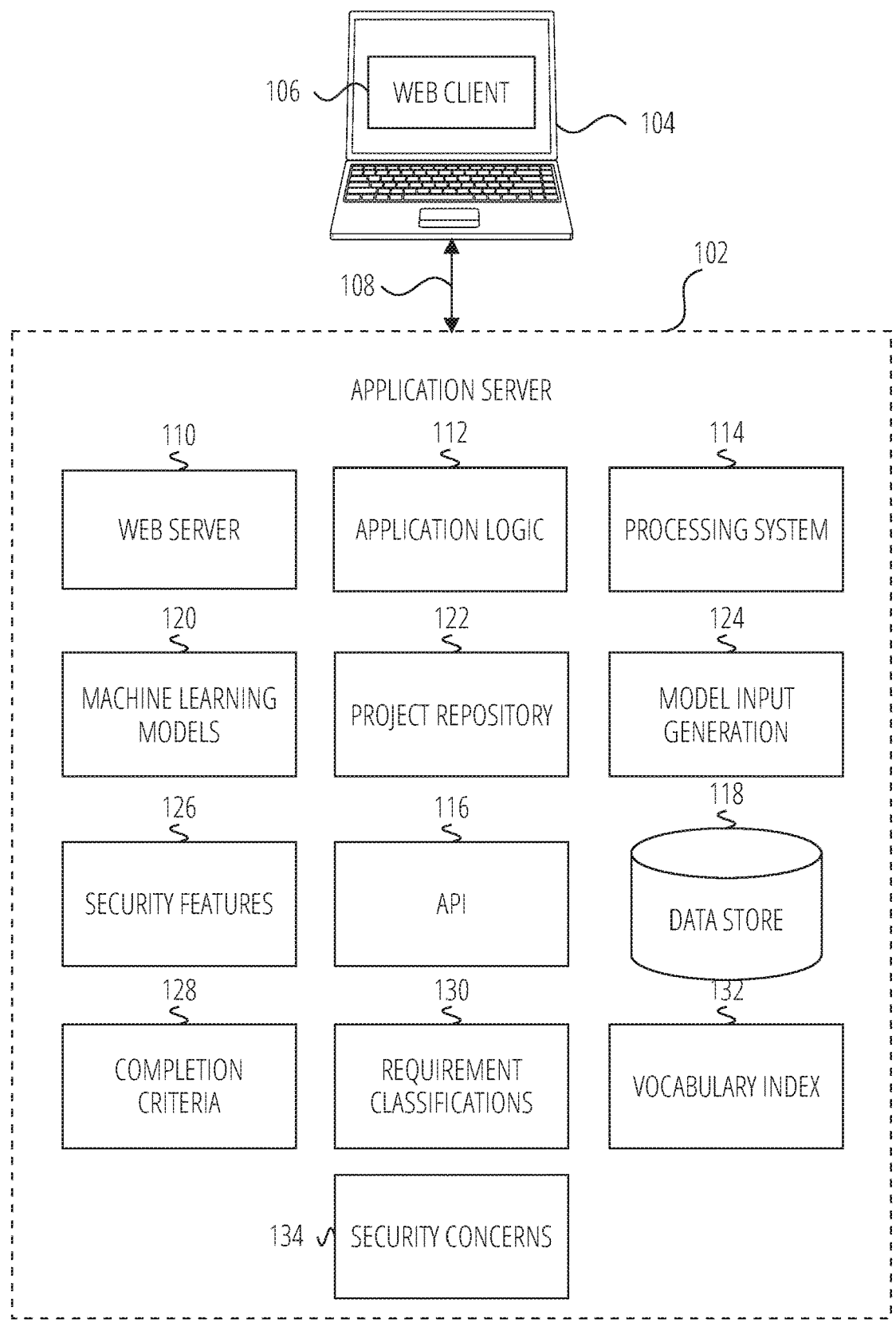
FIG. 1 is an illustration of components of a client device and an application server, according to various examples.

In the following description, for purposes of explanation, numerous specific details are set forth to provide a thorough understanding of some example embodiments. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include data transmitted (e.g., a hypertext markup language file) from a first device (such as a web server to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all the portions/elements are displayed simultaneously. Unless explicitly indicated as such, the use of "presenting a user interface" does not infer either one of these options.

Additionally, the elements and portions are sometimes described as being configured for a certain purpose. For example, an input element may be described as configured to receive an input string. In this context, "configured to" may mean presentation of a user interface element that can receive user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

The goal of maintaining the security of applications is increasingly unable to keep pace with the fast-paced nature of software development. Various approaches have attempted to make up for the lack of available of requisite security experts using various tools and processes to help manage the workload and apply security expertise in more automated ways.

For example, some tools use rule or signature-based engines to detect security faults, but these are only as accurate as the inputs and the rules or signatures are point-in-time notices and relatively slow to change. The outputs of these tools may lack granularity, preciseness, and applicability that lead to high false-positive results or a disassociation of risk from specific business or technical concerns. This, in turn, results in manual intervention by experts. Conversely, a false-negative results in adding risk into a system—the opposite of the goal of automating in the first place. Moreover, these tools and processes tend to be created in parallel to non-security tools and processes and managed by information and cyber security experts, which compounds the problem of expert scalability.

The result tends to be a philosophical and practical separation between the treatment and application of security defects and requirements, and business and technical defects and requirements. This can be observed, for example, in an agile software development lifecycle that requires business and technical user descriptions to meet completion criteria (sometimes referred to as a Definition of Done) to be deployed, but do not prescribe specific security-related acceptance criteria.

In some instances, a separate set of completion requirements are generated for security focused requirements. For example, a survey may be used for gathering application information and intended changes, which may be used to generate best-guess security guidance and requirements based on answers to surveys. But the output of these tools is only as good as the manual claims made by people, who may be different people than those who defined the business and technical requirements, or different people each time the surveys are completed. The result is the prescription of stand-alone security requirements and features from tools based on information other than the original work requirements documented in business and technical requirements and descriptions. Fine-tuning these security requirements requires significant manual effort to validate the accuracy of survey claims and compare generated security requirements results with the business and technical change requirements, compounding the expert scalability problem.

Additionally, the requirements are dissociated from the specifically impacted business and technical user stories (e.g., the description of how an application should function). The result is a business deploying software changes that while meeting the business/technical requirements, fail the security requirements. Due to this separation, a security governance process may be used to track and remediate unmet security requirements and security defects. Once again, this compounds the problem of expert scalability and disassociation of security risk from business and technical concerns. In sum, the lack of availability of enough resources (human, time, computing) results in products potentially being released with security defects.

In view of the above, a technical solution to the technical problem of application security is described herein. The solution is not simply automating what has been done by humans in the past—as there is no current human solution that meets the security requirements in a timely fashion and volume of software and product changes in the agile development cycle. The described solution is also necessarily an improvement to computing systems as it results in deploying program code that is more secure than it would have been previously.

For convenience, the systems and methods described with respect to the solution are discussed in the context of a software application being developed. However, the described functionality may also be applied to updates to an application, new features of an application, microservices, scripts, website functions, etc.

At an early stage in the software development cycle, descriptions of functionality that should be included in the application are determined. In many instances, the genesis of the idea for an application is not from technical personnel but from user requests or personnel that understands the needs of their customers. Because of this, the descriptions may be written in a narrative form (e.g., a user story) as if they were coming from a user directly. These narrative forms are referred to herein as functional requirements. A project may have multiple user stories. As an example, a user story may be, "As a user, I want the ability to change my own user profile information so that I can ensure that my personal information is accurate and current."

The systems and methods described herein utilize machine learning models to classify the written functional requirements of an application in at least two different manners. A first machine learning model may use the functional requirements as input and output probabilities of security concerns. Based on the probability of a security concern, security acceptance criteria may be added to the application. These criteria may be added as part of the completion criteria during software sprints (e.g., a scheduled update to the application), thereby eliminating the possibility that a known security concern is not addressed before the application may be released or updated.

A second machine learning model uses the functional requirements of an application as input and outputs requirement classification probabilities. The requirement classifications may be mapped to security features/practices to be added as completion criteria to the application.

Further, combinations of the output classifications can be processed to gain an understanding of the security impacts of different combinations of business and technical requirements/user stories. Automated analysis of these combinations can be used to prescribe accurate, contextual, and specific stand-alone security requirements or features, and even security practices that would otherwise not be necessary without stacking of risks through combined business and technical requirements/user stories. For example, if a new privileged user type is required, and a new Single Sign-on authentication mechanism is required, a Threat Modeling exercise may be prescribed.

Based on a threshold of probability scores for each output label/classification, and the various combinations of high-probability classifications, security requirements, features, and/or practices can be prescribed and imported into work management tools (e.g., Jira Project® backlog).

In various examples, the machine learning models may include Natural Language Processing (NLP) and deep learning techniques such as Recurrent Neural Networks (RNN), transformations, sigmoid activation functions, and binary cross-entropy loss functions as discussed in further detail below.

FIG. 1 is an illustration of components of a client device and an application server, according to various examples. FIG. 1 includes an application server 102, a client device 104, a web client 106, data 108, a web server 110, an application logic 112, a processing system 114, an application programming interface (API 116), a data store 118, machine learning models 120, a project repository 122, a model input generation component 124, security features 126, completion criteria 128, requirement classifications 130, a vocabulary index 132, and security concerns 134.

Application server 102 is illustrated as set of separate elements (e.g., component, logic, etc.). However, the functionality of multiple, individual elements may be performed by a single element. An element may represent computer program code that is executable by processing system 114. The program code may be stored on a storage device (e.g., data store 118) and loaded into a memory of the processing system 114 for execution. Portions of the program code may be executed in parallel across multiple processing units (e.g., a core of a general-purpose computer processor, a graphical processing unit, an application specific integrated circuit, etc.) of processing system 114. Execution of the code may be performed on a single device or distributed across multiple devices. In some examples, the program code may be executed on a cloud platform (e.g., MICROSOFT AZURE® and AMAZON EC2®) using shared computing infrastructure.

Client device 104 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client device 104 may be used in several manners for interacting with application server 102. For example, a client device 104 may be used to generate the functional requirements for an application. A user interface with user interface elements may be presented on client device 104—as served from application server 102 via web server 110. The user interface elements may include input boxes for the functional requirements as well as an identifier of the application to be developed or updated. After the user has inputted the requirement(s), they may be saved as entries in a table of a database as associated with the application in project repository 122.

A client device may also be used to help train machine learning models 120. Briefly, if an output of a machine learning model is incorrect, a user may indicate it as such and indicate the correct answer. The machine learning model may then generate an input vector, which is run through the machine learning model, to update weights of one or more nodes to better reflect the correct answer in the future using backpropagation or other training technique. The training and use of machine learning models 120 is discussed in further detail below.

Client device 104 and application server 102 may communicate via a network (not shown). The network may include local-area networks (LAN), wide-area networks (WAN), wireless networks (e.g., 508.11 or cellular network), the Public Switched Telephone Network (PSTN) Network, ad hoc networks, cellular, personal area networks, or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet. Client device 104 and application server 102 may communicate data 108 over the network. Data 108 may include web applications, user selection, training data, and functional requirements according to various examples.

In some examples, the communication may occur using an application programming interface such as API 116. An API provides a method for computing processes to exchange data. A web-based API may permit communications between two or more computing devices such as application server 102 and web client 106. The API may define a set of HTTP calls according to Representational State Transfer (RESTful) practices. A RESTful API may define various GET, PUT, POST, DELETE methods to create, replace, update, and delete data stored in a data store 118. For example, a POST call may be used when a user inputs a functional requirement for an application. Another API call be used to obtain output values from one of machine learning models 120.

Application server 102 may include web server 110 to enable data exchanges with client device 104 via web client 106. Although generally discussed in the context of delivering webpages via the Hypertext Transfer Protocol (HTTP), other network protocols may be utilized by web server 110 (e.g., File Transfer Protocol, Telnet, Secure Shell, etc.). A user may enter in a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 110. In response, web server 110 may transmit a web page that is rendered on a display device of a client device (e.g., a mobile phone, desktop computer, etc.).

Additionally, web server 110 may enable a user to interact with one or more web applications provided in a transmitted web page. A web application may provide user interface (UI) components that are rendered on a display device of client device 104. The user may interact (e.g., select, move, enter text into) with the UI components, and, based on the interaction, the web application may update one or more portions of the web page. A web application may be executed in whole, or in part, locally on client device 104. The web application may populate the UI components with data from external sources or internal sources (e.g., data store 118) in various examples. The web applications may be used to enter in functional requirements, train machine learning models 120, or view the completion criteria for applications, among other uses.

The web application (and other internal functionality) may be executed according to application logic 112. Application logic 112 may use the various elements of application server 102 to implement the web application and use/train of machine learning models 120. For example, application logic 112 may issue API calls to retrieve or store data from data store 118 and transmit it for display on client device 104. Similarly, data entered by a user into a UI component may be transmitted using API 116 back to the web server. Application logic 112 may use other elements (e.g., project repository 122, model input generation component 124, security features 126, completion criteria 128, and requirement classifications 130, etc.) of application server 102 to perform the described functionality.

Data store 118 may store data that is used by application server 102. In various examples, project repository 122, machine learning models 120, security features 126, completion criteria 128, requirement classifications 130, vocabulary index 132, and security concerns 134 are stored in data store 118.

Data store 118 is depicted as singular element but may be multiple data stores. The specific storage layout and model used in by data store 118 may take several forms-indeed, a data store 118 may utilize multiple models. Data store 118 may be, but is not limited to, a relational database (e.g., SQL), non-relational database (NoSQL) a flat file database, object model, document details model, graph database, shared ledger (e.g., blockchain), or a file system hierarchy. Data store 118 may store data on one or more storage devices (e.g., a hard disk, random access memory (RAM), etc.). The storage devices may be in standalone arrays, part of one or more servers, and may be in one or more geographic areas.

Project repository 122 may store data on applications being developed. For example, project repository 122 may be implemented as a project managing system that allows for project creation with a project identifier, tasks to be added to projects, etc. A project may be stored as a data structure with one or more element type. Element types may be functional requirements, completion requirements, security concerns, and security features.

Security features 126, requirement classifications 130, and security concerns 134 may be properties (e.g., elements)

that are part of a project. A requirement classification may be a label applied to a project that indicate business and technical requirements such as "API" or "Self-Managed Profile."

A security concern may be a label that identifies a security classification implicated by a requirement classification. The security concerns may be associated with attack vectors that need to be addressed for a project. For example, a security concern of a "User Input" requirement classification may be "SQL injection." Additionally, each security concern in security concerns 134 may identify one or more entries in completion criteria 128. For example, "SQL injection" may have three criteria in completion criteria 128 of "Parameterize Queries." "Input validation", and "Escape user input." In various examples, when a security concern classification is applied to a project, the associated completion criteria 128 may be added as well. Accordingly, a project/update may not be released to the public unless the completion criteria for the security concern are met.

A security feature may be a label of a classification of security-related features that are implicated by a requirement classification. For example, for a "customer support" requirement classification there may be an "encrypt data in transit" security feature that should be implemented.

Figure 2:
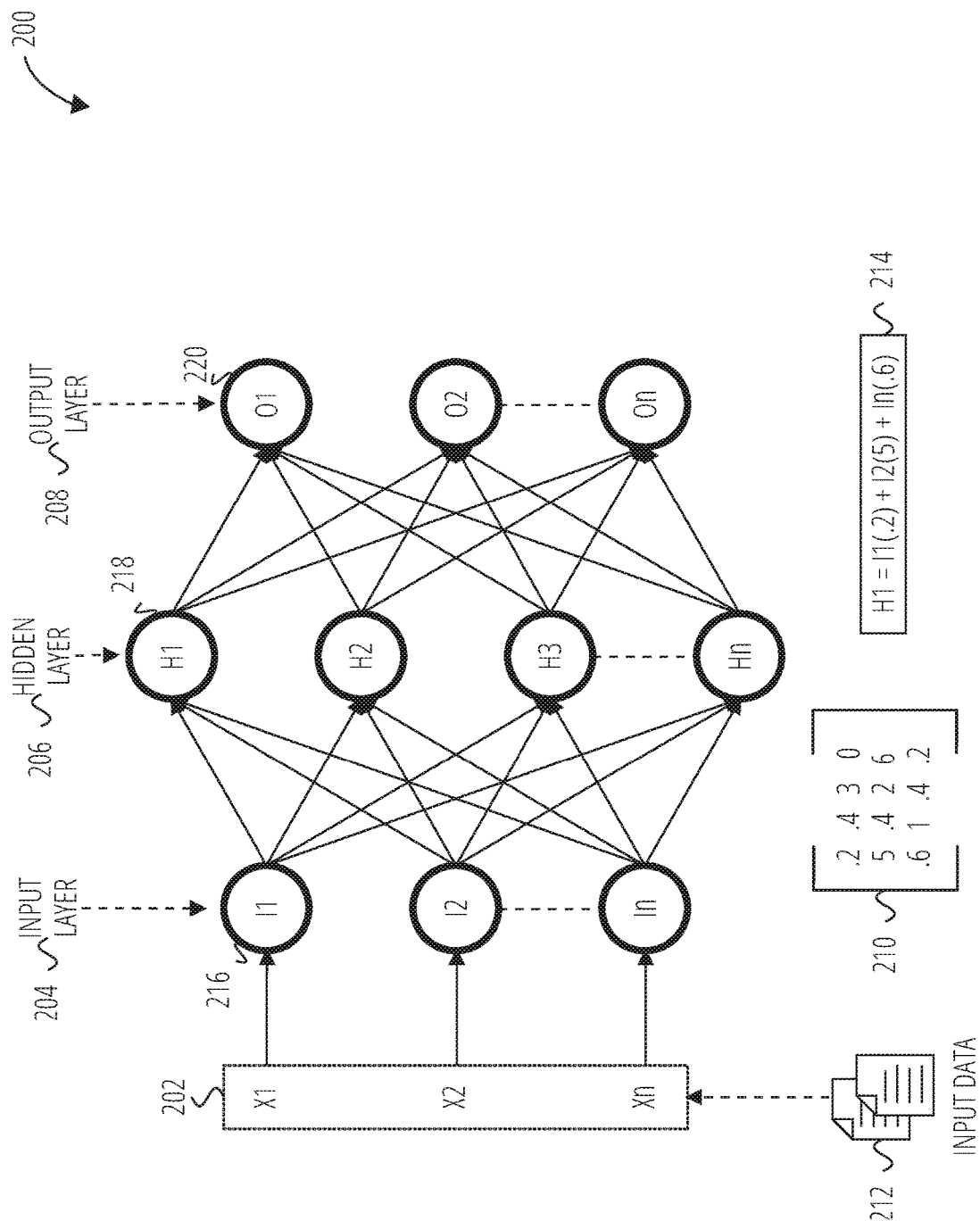
FIG. 2 illustrates an artificial neural network architecture, according to various examples.

FIG. 2 illustrates an artificial neural network 200 architecture according to various examples. Artificial intelligence (AI), machine learning (ML) algorithms, and neural networks are often used interchangeably, but, they are a set of nested concepts. Artificial intelligence may be considered the broadest concept and may be thought of as any program that attempts to perform a task/solve a problem that a human might such as facial recognition, classification, conversation, etc.

A subset of AI is ML. Machine learning encompasses different algorithms that are used to predict or classify a set of data used. In general terms, there are three types of ML algorithms: supervised learning, unsupervised learning, and reinforcement learning-sometimes a fourth, semi-supervised learning is also used.

Supervised learning algorithms may make a prediction based on a labeled data set (e.g., text with a rating of whether it is spam) and are generally used for classification, regression, or forecasting. Some examples of supervised learning algorithms are Naïve Bayes, Support Vector Machines, Linear Regression, Logistic Regression, Decision Trees, Random Forests, and K-Nearest Neighbor. Unsupervised learning algorithms may use an unlabeled data set (e.g., looking for clusters of similar data based on common characteristics). An example of an unsupervised learning algorithm is K-mean clustering.

Reinforcement learning algorithms generally make a prediction/decision, and then a user determines whether the prediction/decision was right-after which the machine learning model may be updated. This type of learning may be useful when a limited input data set is available.

Neural networks (also referred to an artificial neural networks (ANN)) are a subset of ML algorithms that may be used to solve similar problems to those machine learning algorithms listed above. ANNs are computational structures that are loosely modeled on biological neurons. Generally, ANNs encode information (e.g., data or decision making) via weighted connections (e.g., synapses) between nodes (e.g., neurons). ANNs have many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. Multiple matrices may be used when there are multiple layers. ANNs operate by accepting data into an input layer of neurons that often have many outgoing connections to neurons in another layer of neurons. One type of layer, a dense layer, is a layer in which each neuron in one layer is connected to each neuron in the next layer. If there are more than two layers, the layers between an input layer of neurons and an output layer of neurons are referred to as hidden layers. At each traversal between neurons, the corresponding weight modifies the input and may be tested against a threshold at the destination neuron. If the weighted value exceeds the threshold, the value is again weighted, or transformed through a nonlinear function, and transmitted to another neuron further down the ANN graph. If the threshold is not exceeded then, generally, the value is not transmitted to a down-graph neuron and the synaptic connection remains inactive. The process of weighting and testing continues until an output neuron is reached. The pattern and values of the output neurons constitutes the result of the ANN processing.

The correct (e.g., most accurate) operation of most ANNs relies on correct weights. However, ANN designers do not generally know which weights will work for a given application. Instead, a training process is used to arrive at appropriate weights. ANN designers typically choose a number of neuron layers or specific connections between layers including circular connection. A training process generally proceeds by selecting initial weights, which may be randomly selected.

Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached.

With reference back to FIG. 2, the artificial neural network 200 is an example of a shallow neural network—as it has a single hidden layer. Neural networks with more than one hidden layer are considered deep learning machine learning models. If artificial neural network 200 is being trained, input data 212 may be a subset of historical data. When artificial neural network 200 is deployed for use, input data 212 may be the data that is being classified, etc.

The artificial neural network 200 comprises input values 202, an input layer 204, a hidden layer 206, an output layer 208, a weight matrix 210, input data 212, a neuron calculation 214, an input neuron 216, a hidden neuron 218, and an output neuron 220. As discussed in more detail with respect to FIG. 3, input data 212 may be a labeled data set of user stories. The label may correspond to security concerns, requirement classifications, or security features that have been associated with a respective user story in the past.

However, as a conceptual walkthrough example of how a neural network functions, consider that artificial neural network 200 is used for determining a type of animal based on observable features of the animal such as height, weight, and color. Ultimately, the input to a neural network is in a numerical structure, a tensor. A tensor may have any number of dimensions. A zero-dimensional tensor is referred to as a scalar, a one-dimensional tensor is a vector, a two-dimensional tensor may be a matrix, and anything beyond three dimensions may just referred to as a tensor. The shape of a tensor may indicate the number of elements in each dimension.

In the example of animal classification, a vector may be used with three elements—one each for height, weight, and color. In FIG. 2, input values 202 may correspond to the height, weight, and color of an animal. Color, however, is not a numerical value and thus a conversion from a color to a number is used (e.g., brown is a one, red is a two, etc.). As an example, consider that a vector of [16, 7, 1] is an input vector for artificial neural network 200. Accordingly, input neuron 216 may be passed a value of 16.

As indicated above, the connections between layers of neurons are represented as matrices. Weight matrix 210 is an example of weights between input layer 204 and hidden layer 206. Neuron calculation 214 identifies how the value of hidden neuron 218 may be calculated using weight matrix 210 with matrix multiplication. Using the example input vector above, the value of H1 may be [3.2+35+0.6]=38.8. The calculations for each of the other neurons in hidden layer 206 may be calculated in a similar way. The process of calculating values of output neuron 220 and the other output neurons may be made using another weight matrix (not shown).

Activation functions may be used as part of the value calculations of the hidden layer and output layer neurons. Different activation functions may be used depending on the problem that is trying to be solved. For example, for a binary classifier or multi-label classification a sigmoid activation may be used for the output layer. If the desired output is a multi-class classification than a SoftMax activation function may be used on the output layer. Other types of activation functions include, but are not limited to, Tan h, ReLu, Leaky ReLu, Binary step, Identity, and Swish.

Continuing the animal example, the number of output neurons in output layer 208 corresponds to the labeled number of animals—and because the animals are mutually exclusive—this is a multi-class classification style network. In FIG. 2, there are three output neurons indicating that this ANN outputs the probability with respect with three animal types, but an ANN may have thousands or tens of thousands or output neurons. The value of each output neuron may indicate the probability of a classification of an animal type. For example, the value of output neuron 220 may be 0.99 indicating a 99% chance that the input vector corresponds to the animal corresponding to output neuron 220.

Other neural network architecture types (beyond feed-forward) may be used. For example, one problem with feed-forward networks is that they have no "memory" and thus are not the most accurate at predicting inputs that have a temporal order or sequence. Another type of neural network architecture, recurrent neural networks (RNN) feed the results of one pass back into the input layer thereby incorporating a temporal aspect. A further enhancement of a RNN is an RNN with a long short-term memory (LSTM) layer to help overcome the vanishing gradient problem. The architecture of an LSTM layer generally will include four different gates: a forget gate, a learn gate, a remember gate, and a use gate. In combination, these gates help discard certain terms, learn the importance of others, and decides what to pass back as input.

Figure 3:
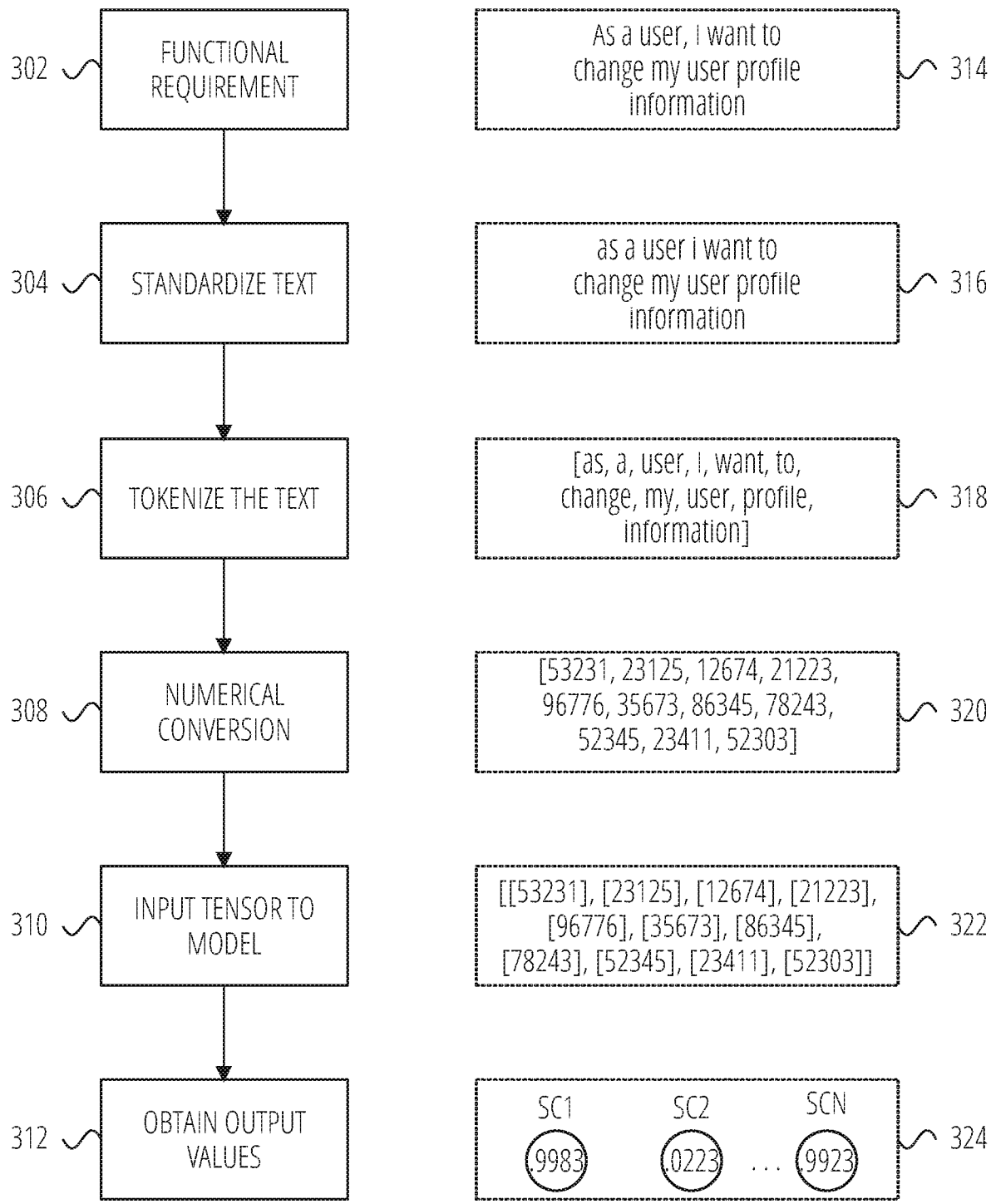
FIG. 3 is an illustration of operations of tensor input generation for a machine learning model, according to various examples.

FIG. 3 is an illustration of operations of generating security concern classifications from a machine learning model, according to various examples. The operations may be performed using components (e.g., application logic 112, machine learning models 120, model input generation component 124, vocabulary index 132, etc.) of a system such as described in application server 102.

The machine learning model described in FIG. 3 may be architected as a recurrent neural network with an LTSM layer. In various examples, the machine learning model may include a dense output layer using a sigmoid activation layer. The number of nodes in the dense layer may be equal to the number of a possible security concerns for a functional requirement. In some examples, a subset of the possible security concerns is used to decrease the computational resources to train the machine learning model, as well as reduce the size of the trained model.

The machine learning model may also use a binary cross entropy cost function during training. The training data may be a labeled set of a user stories (e.g., the functional requirements) and security concerns that have been applied to those stories. The training data may be generated based on historical data residing in project repository 122 or by users labelling past user stories.

In neural networks, the number of nodes in an output layer generally matches the number of defined labels/classifications. Given many possible security concerns, the size and performance of a model may be controlled by defining the label/classification set using a prioritized list that may be generalized at organizational levels for common and consistent coverage, and/or customized at more granular levels such as by application, depending on criteria. For example, the following may be a "top 3" list of security concerns (the columns) with their related acceptance criteria.

| SQL Injection Prevention | Cross-Site Scripting Prevention | Server-Side Request Forgery Prevention |
|---|---|---|
| Parameterize Queries Input validation Escape user input | Input validation Output encoding HTTPOnly cookie flag Implement Content Security Policy | Input validation Block full URLs |

At operation 302 a functional requirement may be retrieved for a project from project repository 122. The functional requirement may be retrieved by an automated process of application server 102 that queries project repository 122 using a project identifier and receives one or more functional requirements in response.

As indicated above, a functional requirement may be a description of features of a project written in narrative form; however, the functional requirement may be in other forms (e.g., a technical requirement document, etc.) and still be used without departing from the scope of this disclosure. For the operations of FIG. 3, consider that the functional requirement states "As a user, I want the ability to change my own user profile information so that I can ensure that my personal information is accurate and current" as indicated in original text 314.

Operations 304, operation 306, and operation 308 may be performed by model input generation component 124, in various examples. At operation 304 the text of the functional requirement may be standardized according to a set of text transformation rules to generate standardized text 316. The set of text transformation rules may include converting all text to a single case (e.g., lower case), removing punctuation, converting special characters to standard representations (e.g., ë to e), etc. At operation 306, the standardized text 316 may be tokenized to generate tokenized text 318. Tokenization may include making each remaining word its own token in a tensor, in various examples.

Operation 308 may perform a lookup of each token of the vector in a dictionary such as vocabulary index 132. Entries in vocabulary index 132 may map a word to a unique numerical value. For example, "as" may be mapped to the value 53231. The result is a numerical array such as numeral converted array 320. In various examples, numerical conversion may, instead of using vocabulary index 132 (or after the conversion), use a text embedding layer of the machine learning model. Each word embedding may correspond to an N-length vector. The text embedding layer may already have values for each of the words. In other examples, a separate machine learning model may be used to obtain the word embedding (e.g., using Word2Vec or GloVe).

Depending on the type of machine learning model, further transformation of the numeral converted array 320 may be performed. For example, the length of the vector may be the same no matter the length (e.g., word count) of the functional requirement. To ensure the same length, padding may be needed. The length of the input vector may correspond to the length of the longest functional requirement. Accordingly, if a current functional requirement has 15 tokens, but the longest has 150, everything from the 16th component to the 150th component may be a '0'.

At operation 310, the input tensor 322 may be inputted into the machine learning model. The format (e.g., dimensionality, length) of the tensor may be set according to the architecture of the machine learning model. For example, if the machine learning model has a maximum length of input for artificial neural network 200, the tensor input may be trimmed or padded to match the maximum length.

After the machine learning model has been executed, at operation 312, the values of the output layer (e.g., model output 324) may be electronically read (e.g., as part of a JSON API response) to determine if one or more security concerns should be applied to the input functional requirement. For example, if there are three output neurons the following may be used during training Labels: ["SQL Injection Prevention", "Cross-Site Scripting Prevention", "Server-Side Request Forgery Prevention"]. An example output vector may be probabilities: [0.998593, 0.997282, 0.048396]. Thus, the first output node in the output layer may be tied to the SQL injection prevention security concern. If the value is greater than some preset level (e.g., 95%), the security concern and its acceptance criteria may be added to the project associated with the functional requirement in project repository 122.

The above description assumes a machine learning model for determining security concerns for an application. The same general process flow may be used for a second machine learning model to classify the functional requirements with requirement classifications and security features. For discussion purposes, the former machine learning model may be considered a security concerns machine learning model and the second machine learning model may be a requirements machine learning model.

The requirements machine learning model may retrieve a functional requirement and generate an input tensor as discussed for operations 302, 304, 306, and 308. Instead of having output nodes corresponding to security concerns, the output nodes of the requirements machine learning model may be a set of requirement classifications. The requirement classifications may be, but are not limited it, "user input", "personally identifiable information", "self-managed profile", "customer support", and "privileged user".

Accordingly, the output vector of the requirements machine learning model at operation 312 may be Probabilities: [0.998593, 0.927282, 0.998396, 0.649918, 0.232389] corresponding to Labels: ["User Input", "Personally Identifiable Information", "Self-managed Profile", "Customer Support", "Privileged user"]. The output probability scores can be compared to a threshold (e.g., 0.99) to determine whether a classification applies to the input functional requirement. If a probability threshold is met, the classification is applied by updating project data structure associated with the retrieved functional requirement.

Like the security concerns machine learning model, the requirements machine learning model may be trained using historical data of other projects such as past combinations of functional requirements and requirement classifications. Input training tensors may be generated based on the combinations and used to update the weights of nodes of the requirements machine learning model.

The accuracy of the requirements machine learning model may be further enhanced based on accuracy feedback received from a user. For example, when in use and adding requirement classifications to a project, an interface may be presented to a user to confirm or modify the additions. Thus, the user may indicate that a requirement classification based on the machine learning model output is incorrect and a different requirement classification should be applied instead. In response to the accuracy feedback, the project data structure may be updated to remove/add requirement classifications. Furthermore, a tensor may be generated using the functional requirement and user indicated requirement classification and inputted into the requirements machine learning model to update weights of nodes in the machine learning model. A similar accuracy feedback method may be used for the security concerns machine learning model.

An additional feature of the requirements machine learning model is prescribing security requirements based on a combination of functional requirements. For example, if the following user story is modeled in addition to the previous example above, the combination of the two user stories and the processing of their label/classification probabilities may prescribe one or more security requirements/features or practices. "As a customer support representative, I want to masquerade as a user to access their online account so that I can help troubleshoot issues reported by users." This user story may result in the following classifications and probabilities: 1. User input [0.574562] 2. Personally Identifiable Information [0.443295] 3. Self-managed profile [0.728482] 4. Customer support [0.999712] 5. Privileged user [0.999896].

Assuming the requirements machine learning model is trained as an RNN with Long Short-Term Memory (LSTM) units, backpropagation through time can apply multi-labeling to combinations of previous output to predict probabilities on labels representing stand-alone requirements/features and/or practices, such as "Multi-factor Authentication" as a requirement/feature, and "Perform Threat Modeling" as a practice.

Figure 4:
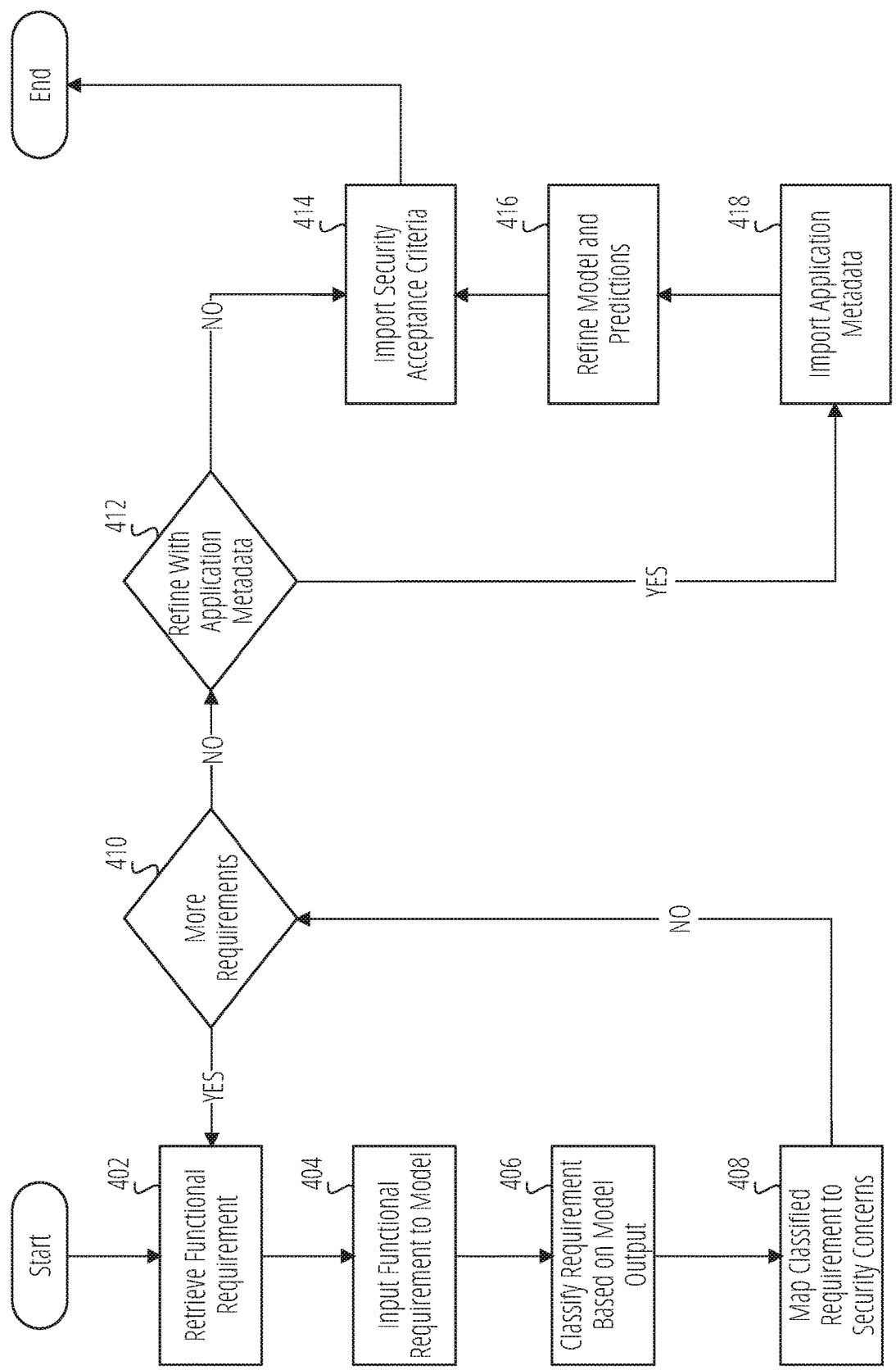
FIG. 4 is a flowchart diagram of adding security acceptance criteria to an application, according to various examples.

FIG. 4 is a flowchart diagram of adding security acceptance criteria, according to various examples. FIG. 4 is described as a series of operations 402 to 418. The operations may be performed using a system such as application server 102 using processing system 114. For example, the method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 402, a functional requirement may be retrieved. For example, an API call may be made to query a project data structure from project repository 122 with a project identifier. The project data structure may have a set of functional requirements for an application and one of the functional requirements may be selected (e.g., a functional requirement that has not been processed yet).

At operation 404, the functional requirement may be inputted into a machine learning model. The machine learning model may have been trained to output the probabilities with respect to set of security concerns for the functional requirement. For example, the machine learning model may be a recurrent neural network with an LSTM layer as discussed in FIG. 2. The machine learning model may be trained using training data that includes prior functional requirements and security concerns associated with the prior functional requirements. As part of the inputting, the functional requirement may be converted into a tensor format as also discussed above.

At operation 406, the functional requirement may be classified according to the accessed values output by the machine learning model, and at operation 408 the classifications may be mapped to a security concern. For example, a lookup table may map each security concern (e.g., as part of security concerns 134) to an output node of the machine learning model. If value of an output node is above a certain threshold (e.g., 0.95) then the functional requirement may be classified according to the security concern that is mapped to the node in the lookup table. Thus, a security concern of the set of security concerns may be added to the project data structure based on the output values.

At decision 410, processing system 114 may check if there are unprocessed functional requirements for the retrieved project data structure. If there are unprocessed functional requirements, operations 402 to operation 408 may be repeated.

At decision 412, an option may be presented (or a previous preference value retrieved) to determine if the application metadata should be used to refine acceptance criteria for classified security concerns. Metadata stored in the project data structure may indicate which programming language(s), frameworks, database types, etc., are used. Depending on the metadata, security concerns may be present that were not immediately apparent from the functional requirement alone. For example, the use of JavaScript may trigger a DOM Cross-Site Scripting concern.

Accordingly, when the decision is made to use application metadata, operation 418 imports the metadata from the project data structure. Then, operation 416 processes the metadata to determine if additional security concerns may be associated with the project based on the metadata. Additionally, the retrieved metadata may be used to automatically assign a priority level to a security concern. For example, security concerns that are based on the metadata may be given a higher priority level than security concerns that were only based on the functional requirement.

At operation 414, security acceptance criteria associated with the applied security concerns may be imported (e.g., retrieved from the project data store) and added as completion criteria to the project (e.g., as entries in the project data structure). For example, different security concerns may be mapped to different completion criteria that are then added to the definition of done for the project in project repository 122. In this manner, an update (e.g., a sprint) to software may not be pushed out to end-users unless the security concerns have been addressed. Automated testing may also be used that focuses on the applied security concerns to determine if the concern has been addressed. For example, if a code commit is received for a project (e.g., based on the project identifier), the automated testing may be initiated. The automated testing may be configured and applied based on the security acceptance criteria and security concerns (e.g., a specific automated set as opposed to a general testing set).

Figure 5:
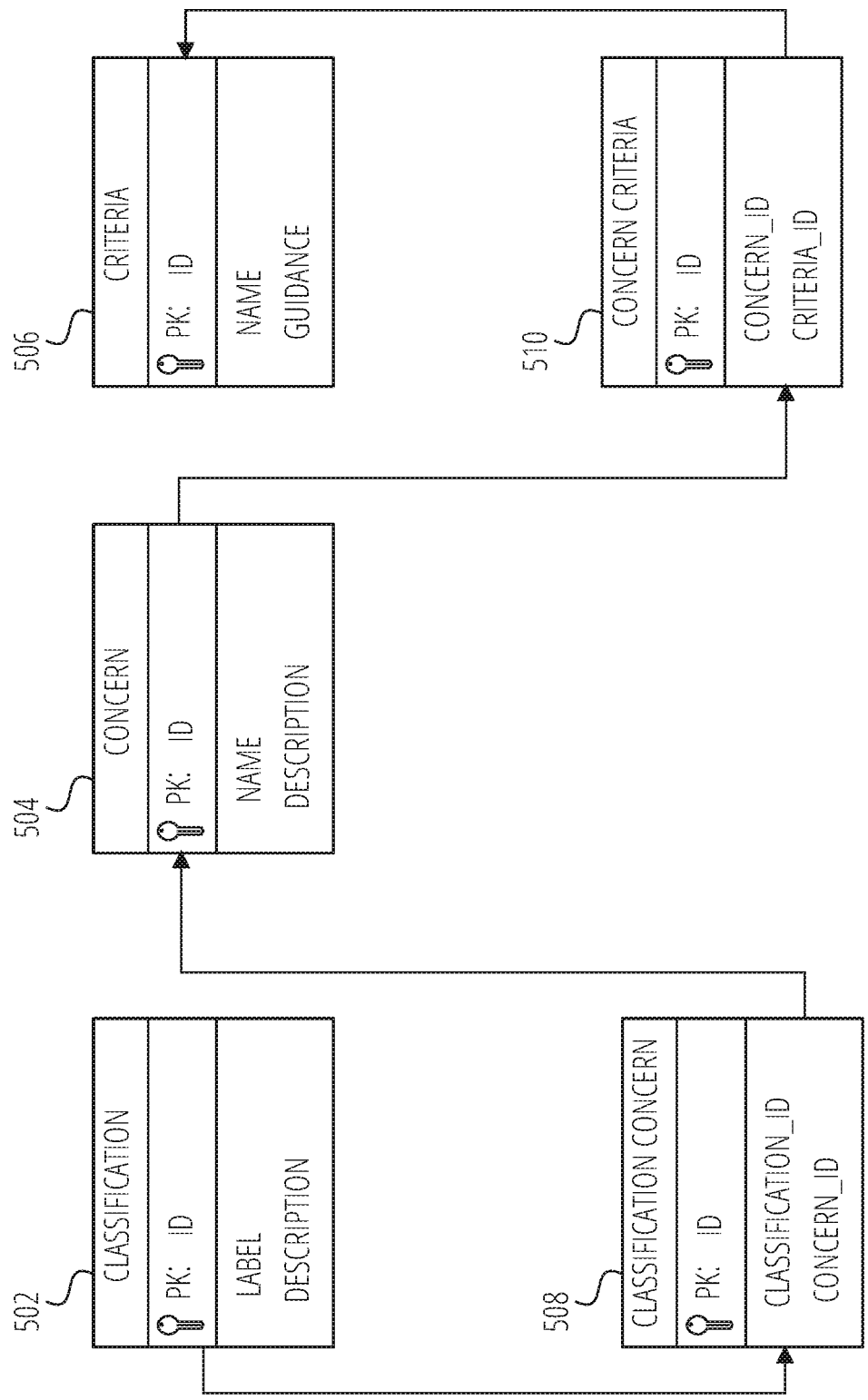
FIG. 5 illustrates a data schema, according to various examples.

FIG. 5 illustrates a data schema, according to various examples. The data schema may represent logical connections between different tables of a database, etc. The names and elements of each schema depicted are one example, and other data arrangements may be used depending on the database type used, etc. Classification Schema 502 may include columns for a label and description of a requirement classification. The Classification Concern Schema 508 has a column for a requirement classification and a security concern using their respective identifiers. For example, Classification Concern Schema 508 includes a classification ID that is a primary key from an entry in a requirement classification table according to Classification Schema 502, and a concern_ID that may be the primary key from an entry in a security concern table according to Concern Schema 504.

Concern Criteria Schema 510 may be used to match up a security concern with completion criteria by having a column for a primary key of a security concern and a primary key of a completion criteria. Criteria Schema 506 may include a column for a completion criteria name and guidance with respect to how to achieve the completion criteria. The labels and relationships in FIG. 5 are one example, and others may be used without departing from the scope of this disclosure. Furthermore, FIG. 5 illustrates a relational database schema, but other types of data linking models may be used as well.

Figure 6:
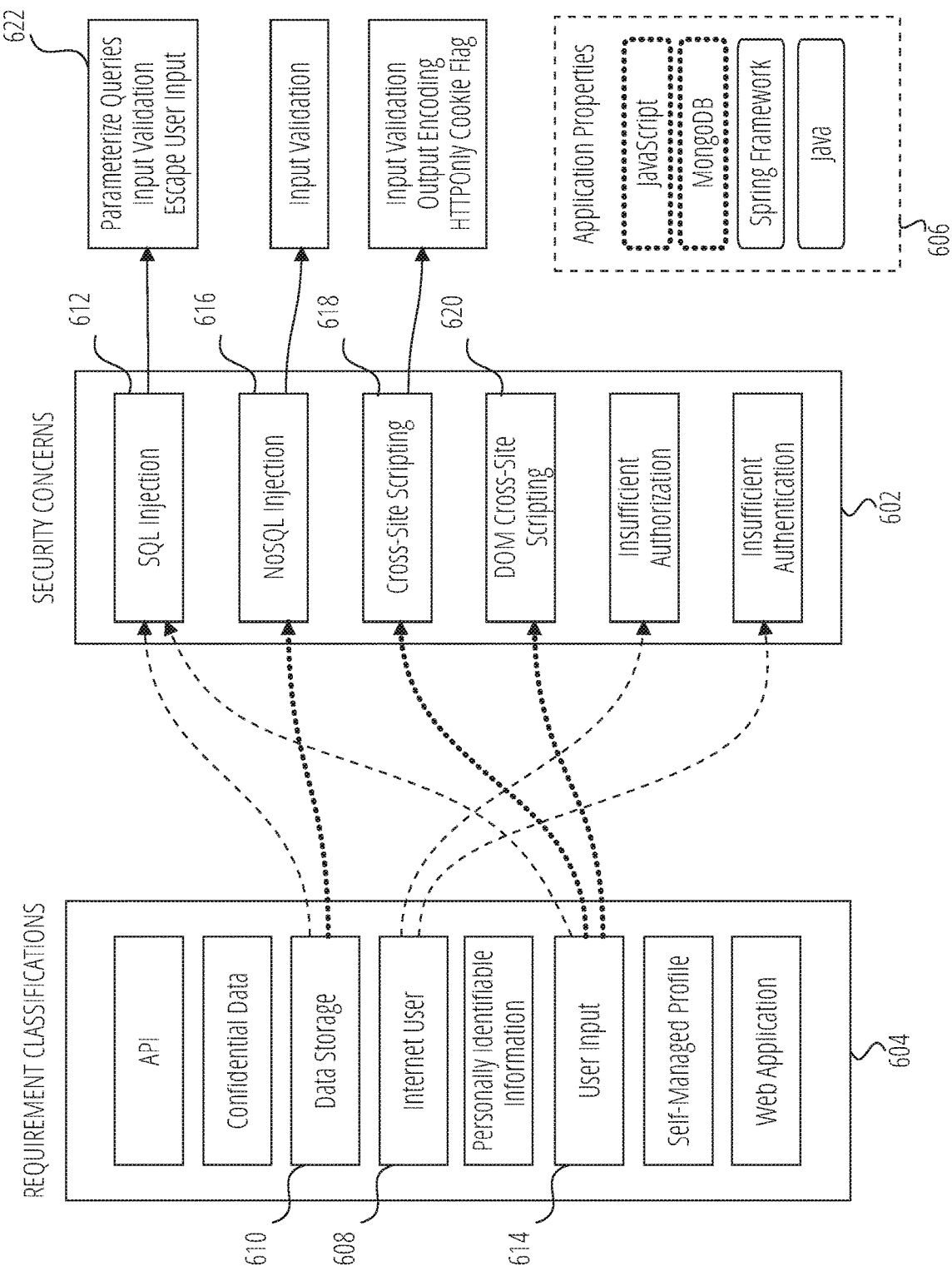
FIG. 6 is a graphical representation of relating requirement classifications and security concerns, according to various examples.

FIG. 6 is a graphical illustration of links between requirement classifications and security concerns, according to various examples. FIG. 6 comprises security concerns 602, requirement classifications 604, and application properties 606. The information depicted may be the results of a query to project repository 122 using a project identifier after a project has gone through a method such as depicted in FIG. 4.

Requirement classifications 604 may identify the categories of requirements that are applicable for an application. Requirement classifications 604 may originate from a project data structure in project repository 122. In various examples, requirement classifications 604 are for a single user story. In other examples, requirement classifications 604 may show all requirements across multiple stories for an application. Each requirement classification may be assigned a unique identifier such that its progress may be tracked for development sprints.

FIG. 6 illustrates that: data storage requirement 610 is linked with SQL injection concern 612 and NoSQL injection concern 616; internet user requirement 608 is linked with the insufficient authorization concern and insufficient authentication concern; and user input requirement 614 is linked with SQL injection concern 612, cross-site scripting concern 618, and DOM cross-site scripting concern 620. FIG. 6 also illustrates completion criteria 622 for SQL injection concern 612.

As discussed with respect to operation 418, application metadata may better inform which security concerns are applicable for an application. FIG. 6 uses different styles of lines to indicate which links are due to application metadata. For example, the outlined style of JavaScript and MongoDB in application properties 606 matches the style of the links between internet user requirement 608 and NoSQL injection concern 616, user input requirement 614 and cross-site scripting concern 618, and user input requirement 614 and DOM cross-site scripting concern 620. This information may be used by a developer to prioritize the NoSQL injection concern 616 and DOM cross-site scripting concern 620 over the SQL injection concern 612, for example.

Figure 7:
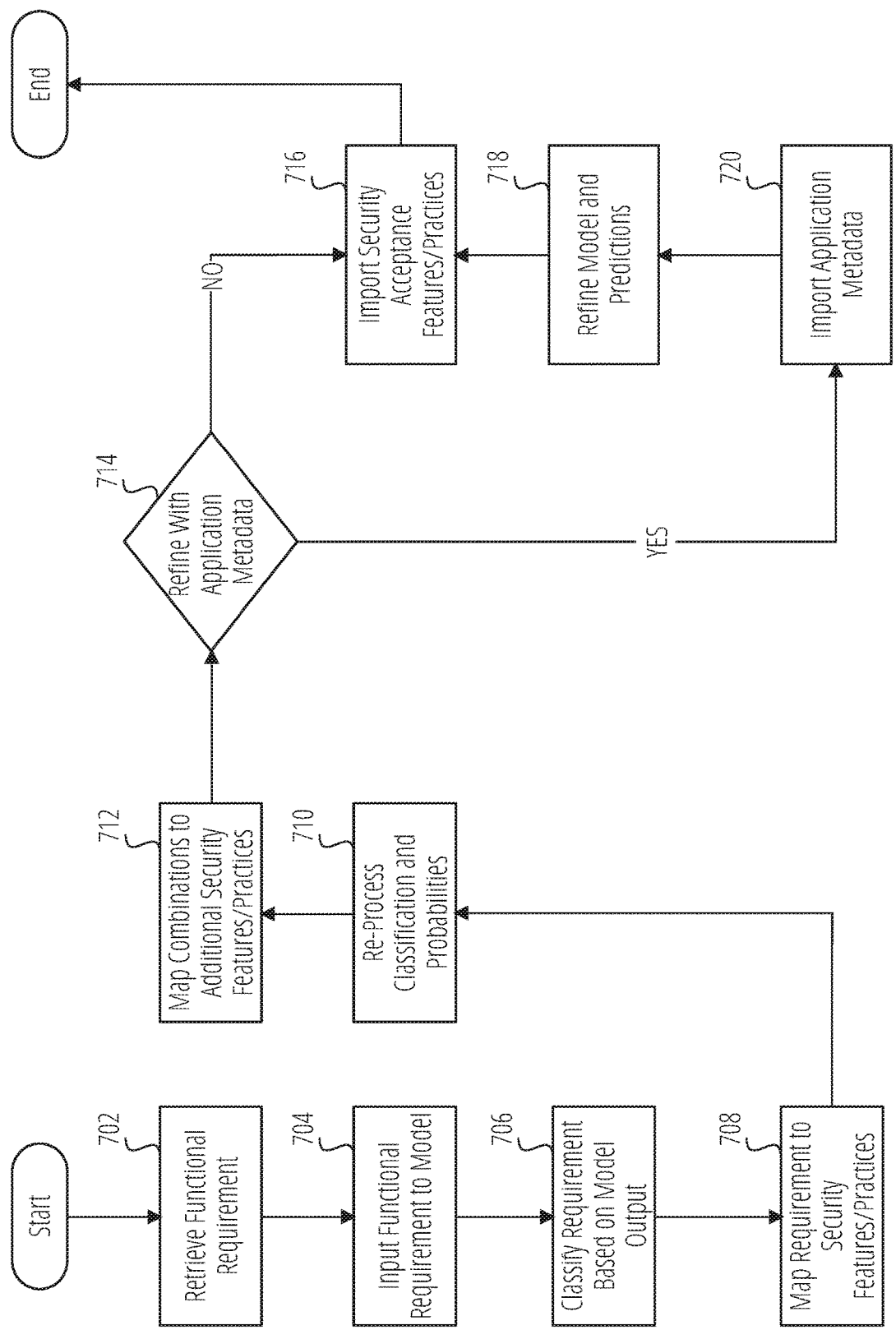
FIG. 7 is a flowchart diagram of adding security acceptance features to an application, according to various examples.

FIG. 7 is a flowchart diagram of adding security acceptance features to an application, according to various examples. FIG. 7 is described as a series of operations 702 to 720. The operations may be performed using a system such as application server 102 using processing system 114. For example, the method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 7. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 702, a functional requirement may be retrieved. For example, an API call may be made to query a project data structure from project repository 122 with a project identifier. The project data structure may have a set of functional requirements for an application and one of the functional requirements may be selected (e.g., a functional requirement that has not been processed yet).

At operation 704, the functional requirement may be input into a requirements machine learning model. The requirements machine learning model may have been trained to output probabilities with respect to a set or requirement classifications for the functional requirement. For example, the machine learning model may be a recurrent neural network with an LSTM layer as discussed in FIG. 2. The machine learning model may be trained using training data that includes prior functional requirements, requirement classifications, and security acceptance practices associated with the prior functional requirements. As part of the inputting, the functional requirement may be standardized and converted into a tensor format as also discussed above.

At operation 706, the functional requirement may be classified according to the accessed values output by the machine learning model, and at operation 708 the classifications may be mapped to one or more security practices. For example, a lookup table may map each requirement classification (e.g., requirement classifications 130) to an output node of the machine learning model. If value of an output node is above a certain threshold (e.g., 0.95) then the requirement classification may be classified according to the requirement classification that is mapped to the node in the lookup table. Thus, a requirement classification of the requirement classifications 130 may be added to the project data structure based on the output values.

At operation 710, additional functional requirements may be inputted to the requirement requirements machine learning mode for processing. For example, instead of a single functional requirement being part of the input tensor, multiple functional requirements may be combined and inputted (after standardizing, etc.) as a single input tensor. In this manner, requirement classifications that may not have been assigned given a single functional requirement, may be discovered. The output of requirements machine learning model may be used to add additional requirement classifications at operation 712.

At decision operation decision 714, an option may be presented (or a previous preference value retrieved) to determine if the application metadata should be used to refine the requirement classifications or acceptance features. For example, the accuracy of the output can be improved using additional information gleaned from the business and technical requirements themselves (e.g., the input to the model), source code repository scanning/discovery, and/or application metadata from other systems. This additional information may be used in post-processing iterations to determine (e.g., by using a lookup table) which specific security requirements/features and/or practices are more likely applicable. For example, if an application is deployed in Azure public cloud, Okta may be a more specific security feature for Externalize Authentication, Externalize Authorization, and Multi-factor Authentication.

Accordingly, when the decision is made to use application metadata, operation 720 imports the metadata from the project data structure. Then, operation 718 processes the metadata to determine if more specific security acceptance practices or additional requirement classifications should be used and added to the project data structure based on the metadata.

At operation 716, security acceptance features/practices associated with the applied requirement classifications may be imported (e.g., retrieved from the project data store) and added as completion criteria to the project (e.g., as entries in the project data structure). For example, different security features may be mapped to different requirement classifications that are then added to the definition of done for the project in project repository 122. In this manner, an update (e.g., a sprint) to an application may not be pushed out to end-users unless the security feature has been completed. Accordingly, data store 118 may be queried using the requirement classifications to receive the associated security features and then added to the project data structure for the functional requirement.

The nature of security features is that they are generally designed and implemented once, and their related "stories" are not implemented every time like acceptance criteria. As such, a security feature requirement, such as Multi-factor Authentication, may sit in a work backlog for a period of time before being selected for implementation. As such, it may not be appropriate to run security tests for properly implemented multi-factor authentication until the security feature/story is implemented. Doing so may introduce false positives, waste manual review and test cycles, and waste compute resources performing unnecessary automated tests.

In various examples, manual or automated security tests are prescribed (e.g., added a task to the project) when a related security feature requirements/story is selected up for implementation (e.g., assigned to a Sprint or a "Fix Version" in project repository 122). The implementation may be detected automatically based on periodic queries to project repository 122 or a pushed notification. The implementation may be of a code commit that identifies the security feature (e.g., by a task identifier). Because project repository 122 maintains mappings between prescribed security features/requirements/practices and test result categories, test evidence (e.g., results) can be provided to prove Definition of Done for a sprint, etc., as part of the project data structure.

Furthermore, once a security feature requirement has already been added to a project, a task identifier may be generated in project repository 122 as associated with the project data structure. Thus, if a subsequent functional requirement run through the machine learning model results in in the security feature being indicated as required, a second task does not need to be created.

The above examples are applied to various labeling/classification variations to prescribe features, requirements, practices, and other actions, but the solutions are not limited to the application of security features, practices, and other actions. Classifications of stand-alone business and technical requirements, various combinations of requirements, and refinement using application metadata may predict with high probability that the planned changes put software or an application in scope of state, national, and/or international regulations; industry standards; and internal and/or external best practices.

For example, with respect to regulatory impacts, the combination of the following user stories may signify from the model that planned changes place an application in scope of the Global Data Protection Regulation (GDPR) since personal user information is handled, and there appears to be a need for Internationalization support. For example, a machine learning model may be trained on user stories and past regulatory requirements in a manner like the security concerns machine learning model and requirements machine learning model. The output of the machine learning model may result in the prescription of security requirements, features, and/or tests to ensure GDPR requirements are met.

1. As a user. I want the ability to change my own user profile information so that I can ensure that my personal information is accurate and current.
2. As a user, I want the home page to welcome me in my native language so that I don't have to use a translator tool to navigate the web site.
3. As a user, I want my local time to be displayed when I log in to shop so that I know precisely when sales will end.

In the accessibility area, the combination of the following user story and organization location may signify from a machine learning model that a change requires a user interface to make changes, and that a company headquartered in New York City, will be required to meet Accessibility requirements in adherence to the Americans with Disabilities Act (ADA) following the Web Content Accessible Guidelines (WCAG) 2.0 level AA standard. This may result in the prescription of security requirements, features, and/or tests to ensure ADA requirements are met.

1. As a user, I want the ability to change my own user profile information so that I can ensure that my personal information is accurate and current.
2. Address: ACME Co. Headquarters, 1 Broadway St. NYC, NY 10004

In another example, the following user story may signify from the model that planned changes place an application in scope of the Payment Card Industry Data Security Standard (PCI DSS) since the application accepts and stores user credit card information. This may result in the prescription of security requirements, features, and/or tests to ensure that the 12 requirements prescribed in PCI DSS are met.

As a user, I want the ability to enter and save my credit card information so that I can shop and purchase without re-entering my payment information every time I order.

The following PCI DSS requirements would be generated and placed in a work effort (e.g., project repository 122) in this case, and include features and assessments/tests:

1. Install and maintain a firewall configuration to protect cardholder data
2. Do not use vendor-supplied defaults for system passwords and other security parameters
3. Protect stored cardholder data
4. Encrypt transmission of cardholder data across open, public networks
5. Use and regularly update anti-virus software or programs
6. Develop and maintain secure systems and applications
7. Restrict access to cardholder data by business need to know
8. Assign a unique ID to each person with computer access
9. Restrict physical access to cardholder data
10. Track and monitor all access to network resources and cardholder data
11. Regularly test security systems and processes
12. Maintain a policy that addresses information security for all personnel In another example, a new or existing application with a user story similar to the following may classify the application as a Publicly Accessible Application and classify its data as Confidential or Restricted, which for many organizations increases the inherent risk of the application and tends to require more scrutiny for security testing and more stringent security controls.

As a user, I want the ability to enter and save my credit card information so that I can shop and purchase without re-entering my payment information every time I order.

These attributes/characteristics tend to generally apply at the application/software level and persist until either definitions and/or criteria change. Software changes may move applications in and out of scope of prescribed requirements, features, and practices, but this tends to happen less frequently. For example, an Internet application is not likely to move in and out of scope of the Publicly Accessible Application definition from release to release.

As these attributed/characteristics change, a system of record (e.g., project repository 122) maintaining this data may be updated to reflect the change, in an automated way, for example. This helps ensure that the application metadata may be used in future work efforts when the output of business and technical requirement processing may be refined with the data.

Figure 8:
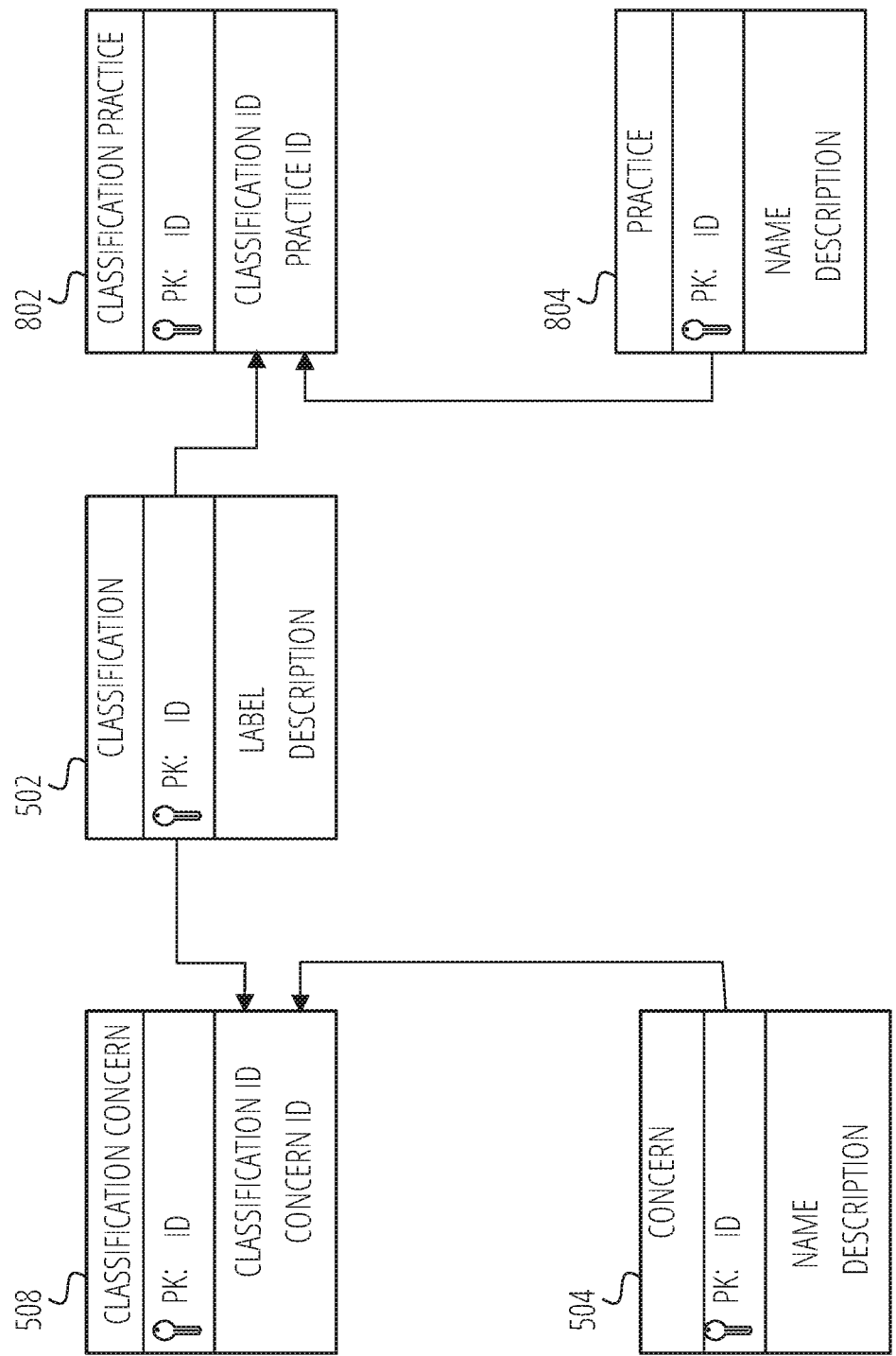
FIG. 8 illustrates a data schema, according to various examples.

FIG. 8 illustrates a data schema, according to various examples. The data schema may represent logical connections between different tables of a database, etc. The names and elements of each schema depicted are one example, and other data arrangements may be used depending on the database type used, etc. As illustrated, the data schema may include parts of the schema of FIG. 5 such as Classification Schema 502, Classification Concern Schema 508, and Concern Schema 504. Additionally, the data schema of FIG. 8 includes a link from Classification Schema 502 to classification practice schema 802, which in turn links to practice schema 804. Practice schema 804 includes a name and description of a security practice. The description may be used to inform a user on how to achieve a security practice for a security feature that has been added as completion criteria to a project data structure.

Figure 9:
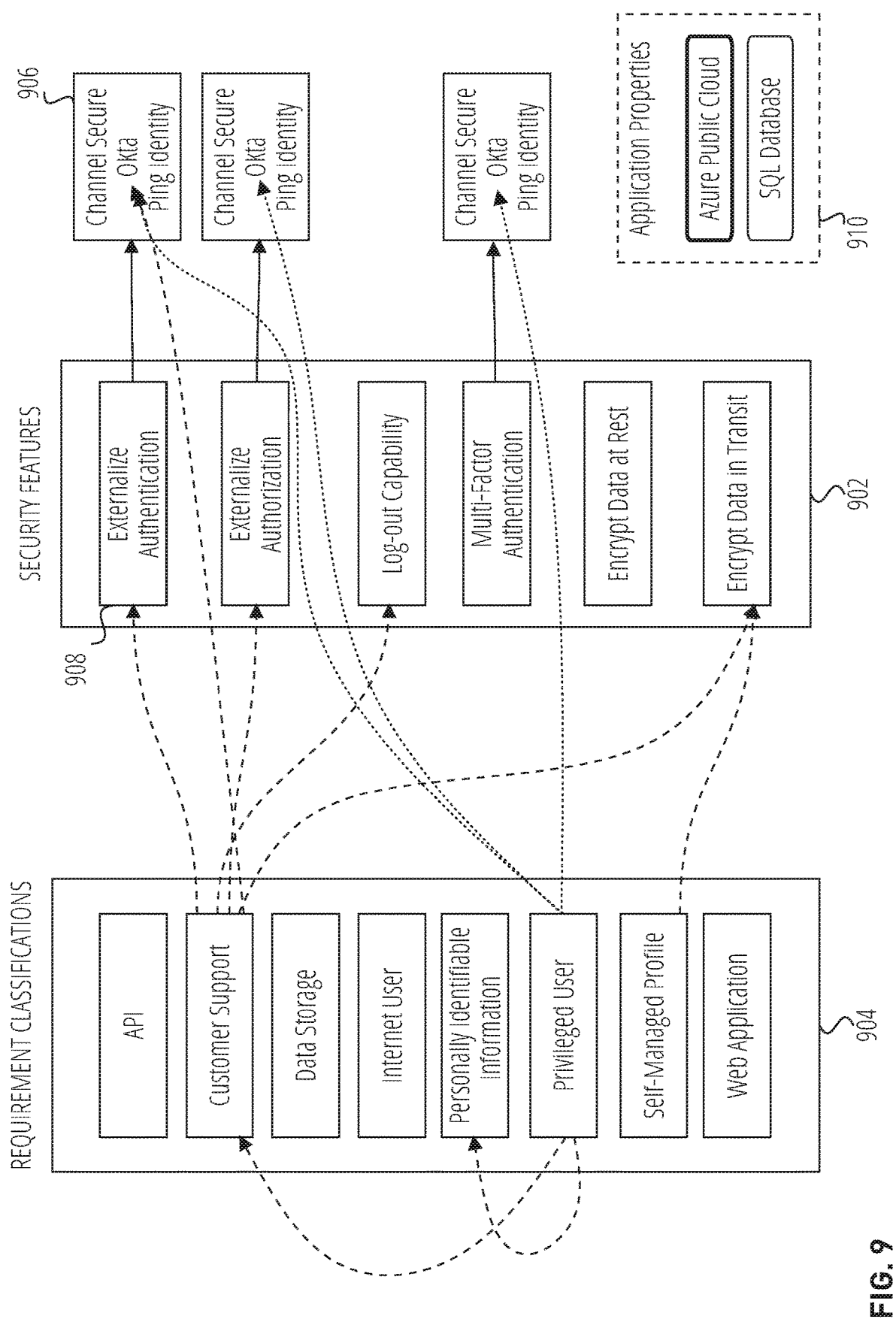
FIG. 9 is a graphical representation of relating requirement classifications and security features, according to various examples.

FIG. 9 is a graphical representation of relating requirement classifications and security features, according to various examples. The information depicted in FIG. 9 may be the result of a query to project repository 122 using a project identifier after a project has gone through a method such as discussed in FIG. 7. Requirement classifications 904 may identify the categories of requirements that are applicable for an application that have been assigned either by a user or as the result of requirements machine learning model. Requirement classifications 904 may originate from a project data structure in project repository 122. In various examples, requirement classifications 904 are for a single user story. In other examples, requirement classifications 904 may show all requirements across multiple stories for an application. Each requirement classification may be assigned a unique identifier in the project repository 122 such that its progress may be tracked for development sprints/bug fixes, etc.

Security features 902 depict security features that may be applicable to an application. As with requirement classifications, the security features may be added manually or based on an automated process (e.g., operations operation 708 and 716). In addition to requirement classifications 904 and security features 902, sub-features 906 may be depicted for an individual security feature. For example, based on application properties 910 (e.g., metadata) it may be determined that Okta is the preferred security feature for implementing the security feature of externalize authentication 908.

Figure 10:
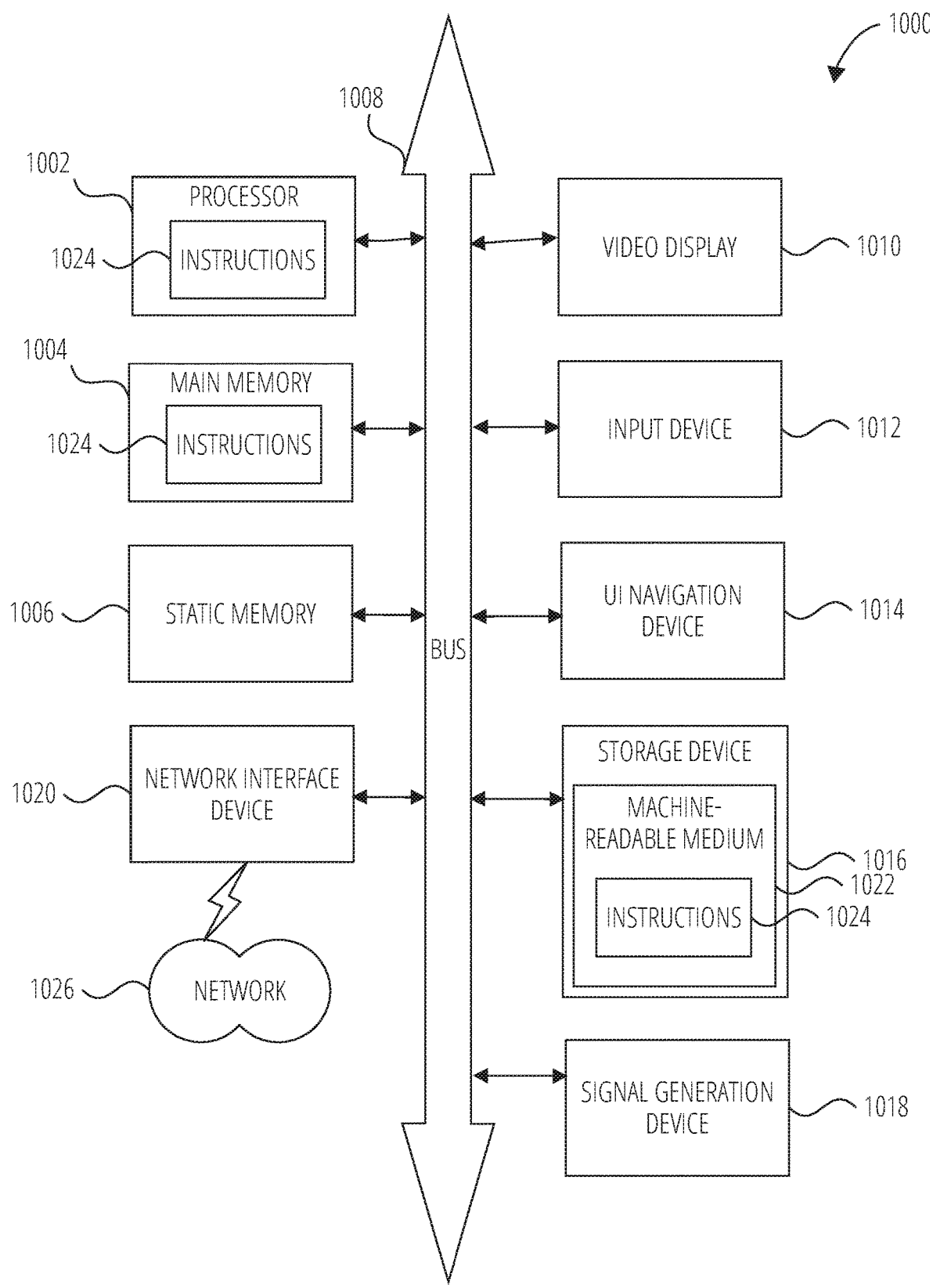
FIG. 10 is a block diagram illustrating a machine in the example form of computer system, within which a set or sequence of instructions may be executed to cause the machine to perform any one of the methodologies discussed herein, according to various examples.

FIG. 10 is a block diagram illustrating a machine in the example form of computer system 1000, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a bus 1008. The computer system 1000 may further include a video display 1010, an input device 1012 (e.g., a keyboard), and UI navigation device 1014 (e.g., a mouse). In one embodiment, the video display 1010, input device 1012, and UI navigation device 1014 are incorporated into a single device housing such as a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensors.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed Database, and/or associated caches and servers) that store the one or more instructions 1024. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 1022 that excluded transitory signals.

The instructions 1024 may further be transmitted or received over a communications network 1026 using a transmission medium via the network interface device 1020 utilizing any one of several well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible medium to facilitate communication of such software The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A computer-implemented method comprising:
    querying, using a processing unit, a project data store with a project identifier;
    in response to the querying, receiving a functional requirement of a project data structure stored as associated with the project identifier;
    inputting, using the processing unit, the functional requirement into a trained machine learning model, the machine learning model configured with output nodes corresponding to a set of requirement classifications;
    after the inputting, accessing, using the processing unit, output values of the output nodes;
    determining that a value of an output node corresponding to a requirement classification of the set of requirement classifications exceeds a threshold;
    based on the determining, adding, using the processing unit, the requirement classification of the set of requirement classifications based on the output values to the project data structure; and
    adding a security feature to the project data structure based on the requirement classification.

2. The computer-implemented method of claim 1, wherein the trained machine learning model is a recurrent neural network with a long short-term memory (LSTM) layer.

3. The computer-implemented method of claim 2, wherein weights of nodes in the LSTM layer are based on inputting past combinations of functional requirements and requirement classifications as tensors into the machine learning model.

4. The computer-implemented method of claim 2, further comprising:
    receiving accuracy feedback from a user of the added requirement classification, the accuracy feedback indicating the added requirement classification was an error;
    receiving another requirement classification of the set of requirement classifications; and
    adding, using the processing unit, the another requirement classification to the project data structure.

5. The computer-implemented method of claim 4, further comprising:
    generating an input tensor based on the accuracy feedback and functional requirement; and
    inputting the input tensor into the machine learning model to update weights of nodes in the machine learning model.

6. The computer-implemented method of claim 1, further comprising:
    querying a data store with the requirement classification as an input;
    in response to querying the data store, receiving the security feature.

7. The computer-implemented method of claim 6, further comprising:
    receiving a notification that the security feature has been implemented based on an update to the project data structure;
    in response to receiving the notification, initiating automated testing of the security feature; and
    adding results of the automated testing to the project data structure.

8. The computer-implemented method of claim 7, wherein the update to the project data structure is based on a code commit identifying the security feature.

9. The computer-implemented method of claim 1, wherein the functional requirement of the project data structure is a first functional requirement and wherein the method further includes:
    retrieving a second functional requirement of the project data structure associated with the project identifier;
    generating an input tensor with the first functional requirement and the second functional requirement;
    inputting the input tensor into the trained machine learning model; and
    based on output values of the output nodes, adding another requirement classification to the project data structure.

10. A non-transitory computer-readable medium comprising instructions, which when executed by a processing unit, configure the processing unit to perform operations comprising:
    querying a project data store with a project identifier;
    in response to the querying, receiving a functional requirement of a project data structure stored as associated with the project identifier;
    inputting the functional requirement into a trained machine learning model, the machine learning model configured with output nodes corresponding to a set of requirement classifications;
    after the inputting, accessing output values of the output nodes;
    determining that a value of an output node corresponding to a requirement classification of the set of requirement classifications exceeds a threshold;

based on the determining, adding the requirement classification of the set of requirement classifications based on the output values to the project data structure; and adding a security feature to the project data structure based on the requirement classification.

11. The non-transitory computer-readable medium of claim 10, wherein the trained machine learning model is a recurrent neural network with a long short-term memory (LSTM) layer.

12. The non-transitory computer-readable medium of claim 11, wherein weights of nodes in the LSTM layer are based on inputting past combinations of functional requirements and requirement classifications as tensors into the machine learning model.

13. The non-transitory computer-readable medium of claim 11, wherein the instructions, which when executed by the processing unit, further configure the processing unit to perform operations comprising:

receiving accuracy feedback from a user of the added requirement classification, the accuracy feedback indicating the added requirement classification was an error;

receiving another requirement classification of the set of requirement classifications; and adding the another requirement classification to the project data structure.

14. The non-transitory computer-readable medium of claim 13, wherein the instructions, which when executed by the processing unit, further configure the processing unit to perform operations comprising:

generating an input tensor based on the accuracy feedback and functional requirement; and inputting the input tensor into the machine learning model to update weights of nodes in the machine learning model.

15. The non-transitory computer-readable medium of claim 10, wherein the instructions, which when executed by the processing unit, further configure the processing unit to perform operations comprising:

querying a data store with the requirement classification as an input;

in response to querying the data store, receiving the security feature.

16. The non-transitory computer-readable medium of claim 15, wherein the instructions, which when executed by the processing unit, further configure the processing unit to perform operations comprising:

receiving a notification that the security feature has been implemented based on an update to the project data structure;

in response to receiving the notification, initiating automated testing of the security feature; and adding results of the automated testing to the project data structure.

17. The non-transitory computer-readable medium of claim 16, wherein the update to the project data structure is based on a code commit identifying the security feature.

18. The non-transitory computer-readable medium of claim 10, wherein the functional requirement of the project data structure is a first functional requirement and wherein the instructions, which when executed by the processing unit, further configure the processing unit to perform operations comprising:

retrieving a second functional requirement of the project data structure associated with the project identifier;

generating an input tensor with the first functional requirement and the second functional requirement;

inputting the input tensor into the trained machine learning model, and based on output values of the output nodes, adding another requirement classification to the project data structure.

19. A system comprising:

a processing unit; and a storage device comprising instructions, which when executed by the processing unit, configure the processing unit to perform operations comprising:

querying a project data store with a project identifier;

in response to the querying, receiving a functional requirement of a project data structure stored as associated with the project identifier;

inputting the functional requirement into a trained machine learning model, the machine learning model configured with output nodes corresponding to a set of requirement classifications;

after the inputting, accessing output values of the output nodes;

determining that a value of an output node corresponding to a requirement classification of the set of requirement classifications exceeds a threshold; and based on the determining, adding the requirement classification of the set of requirement classifications based on the output values to the project data structure; and adding a security feature to the project data structure based on the requirement classification.

20. The system of claim 19, wherein the trained machine learning model is a recurrent neural network with a long short-term memory (LSTM) layer.

* * * * *